United States Patent
Kim

(10) Patent No.: US 10,302,171 B2
(45) Date of Patent: May 28, 2019

(54) DUAL MODE TUNING TYPE DYNAMIC DAMPER AND DRIVE SHAFT DEVICE AND VEHICLE THEREBY

(71) Applicant: Hyundai Motor Company, Seoul (KR)

(72) Inventor: Jae-Man Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 181 days.

(21) Appl. No.: 15/336,610

(22) Filed: Oct. 27, 2016

(65) Prior Publication Data

US 2017/0204936 A1 Jul. 20, 2017

(30) Foreign Application Priority Data

Jan. 18, 2016 (KR) ........................ 10-2016-0005934

(51) Int. Cl.
| | |
|---|---|
| *B60K 17/22* | (2006.01) |
| *F16F 15/14* | (2006.01) |
| *B60K 17/24* | (2006.01) |
| *F16F 7/108* | (2006.01) |
| *B60K 5/04* | (2006.01) |

(52) U.S. Cl.
CPC .......... *F16F 15/1442* (2013.01); *B60K 17/24* (2013.01); *F16F 7/108* (2013.01); *B60K 5/04* (2013.01); *B60K 17/22* (2013.01); *F16F 2222/08* (2013.01); *F16F 2224/025* (2013.01); *F16F 2232/02* (2013.01)

(58) Field of Classification Search
CPC .. F16F 15/1442; F16F 7/108; F16F 2224/025; F16F 2232/02; F16F 15/14; F16F 15/144; F16F 15/1435; B60K 17/24; B60K 5/04
See application file for complete search history.

(56) References Cited

U.S. PATENT DOCUMENTS

| | | | | |
|---|---|---|---|---|
| 7,635,118 | B2 * | 12/2009 | Hayashi | F16F 15/1442 267/141.2 |
| 9,920,813 | B2 * | 3/2018 | Kim | F16F 7/108 |
| 2014/0202278 | A1 * | 7/2014 | Murata | F16F 15/1414 74/574.4 |

FOREIGN PATENT DOCUMENTS

| | | | |
|---|---|---|---|
| JP | H07-208550 A | 8/1995 | |
| JP | H10-196722 A | 7/1998 | |
| JP | 02154827 A | * 12/1998 | .............. F16F 15/02 |
| JP | 2003139196 A | * 10/2001 | ............ F16F 15/126 |
| JP | 2004-263765 A | 9/2004 | |
| JP | 2005-024011 A | 1/2005 | |
| JP | 2006-226521 A | 8/2008 | |
| JP | 2015-169324 A | 9/2015 | |
| KR | 10-2013-0046719 A | 5/2013 | |
| KR | 10-2015-0026074 A | 3/2015 | |

* cited by examiner

*Primary Examiner* — Faye M Fleming
(74) *Attorney, Agent, or Firm* — Morgan, Lewis & Bockius LLP

(57) ABSTRACT

A dual mode tuning dynamic damper may include a hollow main bridge extending in an axial direction of a damper housing in a position exterior to a damper mass filled in the damper housing and forming a dual concentric circle with the damper housing, and an auxiliary bridge disposed at a connection section of the dual concentric circle for side portions of the damper mass to be supported by the main bridge.

14 Claims, 7 Drawing Sheets

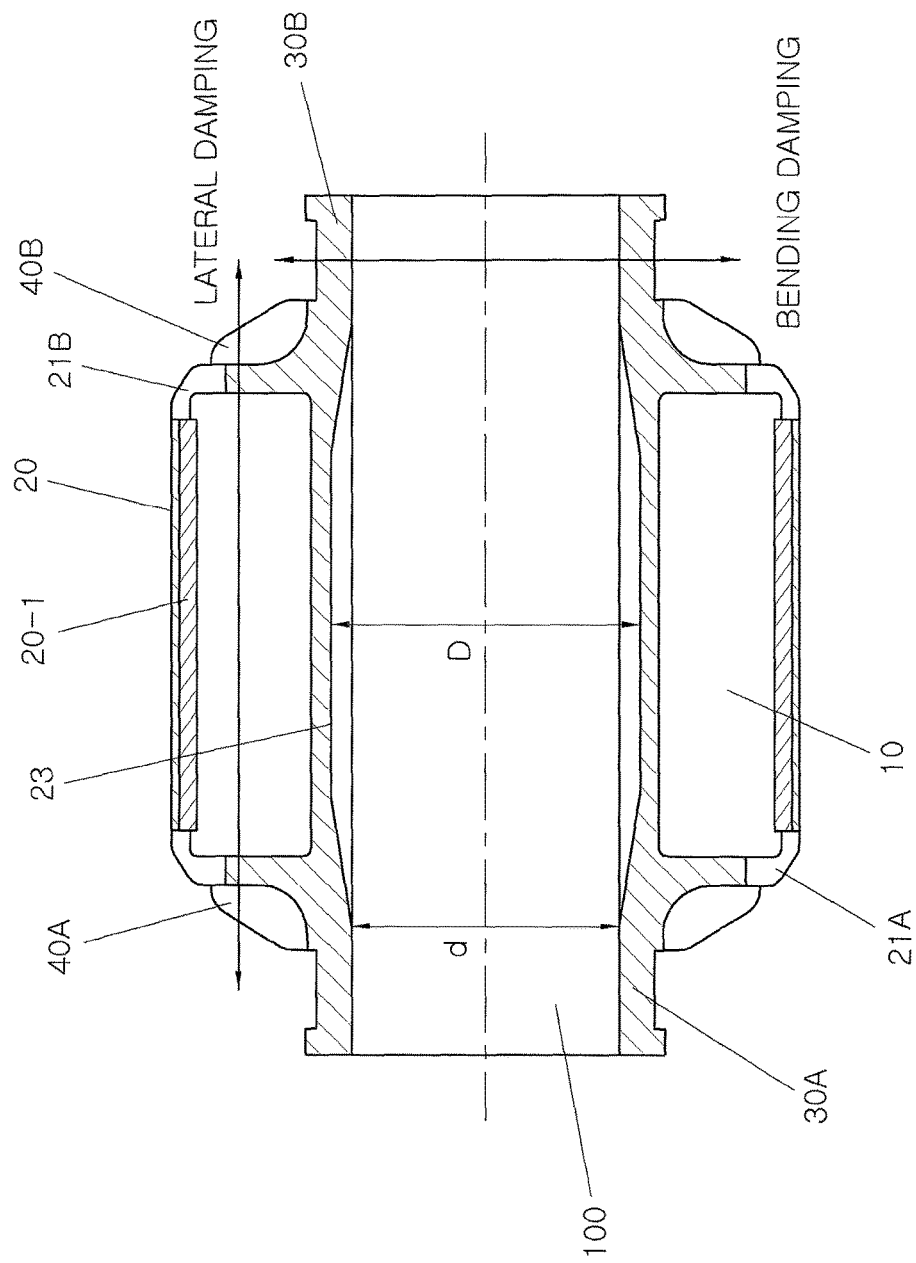

DUAL MODE TUNING TYPE DYNAMIC DAMPER AND DRIVE SHAFT DEVICE AND VEHICLE THEREBY

CROSS-REFERENCE TO RELATED APPLICATION

The present application claims priority to Korean Patent Application No. 10-2016-0005934, filed Jan. 18, 2016, the entire contents of which is incorporated herein for all purposes by this reference.

BACKGROUND OF THE INVENTION

Field of the Invention

The present invention relates to a damper, and more particularly, a dual mode tuning type dynamic damper including a lateral mode capable of tuning a resonant frequency at a bending mode and a drive shaft device and a vehicle thereby.

Description of Related Art

Generally, vehicle driving generates resonance with rotation degree component of a power train and vehicle wheels (wheel and tire) by that the power of a power train is transmitted to vehicle wheels through a drive shaft.

For example, the rotation secondary degree of the power train and the rotation degree component (1.9-2.1 degree) adjacent thereto generate the resonance, and the resonance is progressed to vibration through the drive shaft along with beat noise (driving booming noise) sounding like "ung-ung-ung."

Therefore, various means have been applied in order to improve the beat noise and the vibration.

For example, there is a resonance frequency avoidance method.

The resonance frequency avoidance method is a method of separating the vibration mode of the drive shaft from the vibration mode of the power train by coupling a damper to the drive shaft, observing that the driving booming noise and vibration are generated by resonance when the vibration mode of the power train and the vibration mode (bending mode) of the drive shaft are coincided with each other.

As a result, the damper (generally, a dynamic damper) greatly improves a frequency avoidance performance of a problem so that the driving booming noise and vibration minimally occur.

As another example, there is a resonance rotation degree avoidance method.

The resonance rotation degree avoidance method is a method avoiding resonance of the drive shaft by greatly altering ball type joint specifications applied to the drive shaft and the vehicle wheels.

As a result, an eight balls type joint greatly improves rotation degree avoidance performance of a problem in comparison with a six balls type joint to minimize the driving booming noise and vibration generation.

However, the resonance rotation degree avoidance method should upgrade ball joint specifications to result in greater manufacturing cost rise.

Otherwise, the resonance frequency avoidance method has a merit of relatively low manufacturing cost by ½ in comparison with the resonance rotation degree avoidance method, but it is impossible to tune a lateral mode of the damper so that the number of the damper should be increased in order to improve the resonance frequency avoidance performance. The increased number of the damper causes greater manufacturing cost increase by increased raw material cost so that it is bound to be a limitation on the application.

This is caused because the damper is not tunable lateral mode tuning structure having the greatest influence by taking a bending mode as a main mode, whereas the beat noise (driving booming noise) and vibration caused by the drive shaft is in a range of 140~160 Hz appearing in the horizontal direction (lateral direction) of the drive shaft.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a dual mode tuning type dynamic damper and a drive shaft device and a vehicle thereby capable of improving resonance frequency avoidance performance of a drive shaft with only one damper by frequency adjustment through the increase and adjustment of a lateral mode, particularly, tuning the lateral mode with maintaining a main mode of the damper to a bending mode, thereby improving the damper performance without a change of design.

According to various aspects of the present invention, a dual mode tuning type dynamic damper may include a hollow main bridge extending in an axial direction of a damper housing in a position exterior to a damper mass filled in the damper housing and forming a dual concentric circle with the damper housing, and an auxiliary bridge disposed at a connection section of the dual concentric circle for side portions of the damper mass to be supported by the main bridge.

A bridge flange may be formed at the connection section, and the bridge flange may be connected to the main bridge in the damper housing to form the auxiliary bridge.

The bridge flange may form a round section of a gentle curved surface.

A thickness of the auxiliary bridge may be less than that of the main bridge.

The auxiliary bridge may be formed in a right-angled triangle cross-sectional structure having a base line of a round shape.

The auxiliary bridge may be formed at the connection section in plurality.

Each of the plurality of auxiliary bridges may form an equal interval with respect to each other.

An inner diameter of the main bridge may be smaller than an inner diameter of an axial hole of the damper housing.

Each of the main bridge and the auxiliary bridge may be formed at left and right sides of the damper mass.

The damper mass may be rubber material mass not forming a void.

The damper housing may include a cylinder shape of a dual tubular structure where an inner space thereof filled with the damper mass is divided by an axial hole, and an inner diameter of the axial hole may be greater than an inner diameter of the main bridge.

A plurality of notch grooves may be formed at the damper housing by cutting.

According to various aspects of the present invention, a drive shaft device including a dynamic damper may include a damper housing in which a damper mass as rubber material mass for damping function is filled, a pair of a main bridge and a rear main bridge being hollow pipes which extend in left and right axial directions of the damper housing in a position outside a longitudinal section size of the damper mass in order to form a dual concentric circle with the damper housing, and a pair of an auxiliary bridge and a rear auxiliary bridge disposed at a connection section of the dual concentric circle for the left and right sides of the damper mass to be supported by the main bridge and the rear main bridge, respectively.

The dynamic damper may be disposed at at least one of a right drive shaft connected with a right vehicle wheel via a ball joint and a left drive shaft connected with a left vehicle wheel via a ball joint.

According to various aspects of the present invention, a vehicle may include a drive shaft device including a dynamic damper having a damper housing in which a damper mass as rubber material mass for damping is filled, a pair of a main bridge and a rear main bridge including hollow pipes which extend in left and right axial directions of the damper housing in a position outside a longitudinal section size of the damper mass in order to form a dual concentric circle with the damper housing, and a pair of an auxiliary bridge and a rear auxiliary bridge disposed at a connection section of the dual concentric circle for supporting the left and right sides of the damper mass by the main bridge and the rear main bridge, respectively, and a power train for transmitting torque to the drive shaft device.

The power train may include an engine and a transmission, and a transmission output shaft of the transmission may be connected with the drive shaft device.

The dynamic damper of various embodiments of the present invention in which the frequency tuning in an up and down direction by a bending mode maintains a main mode and adds frequency tuning in a lateral direction by a lateral mode, can greatly improve the resonance frequency avoidance performance with only one damper.

Further, the dynamic damper of various embodiments of the present invention realizes the lateral mode with an auxiliary bridge using the outside of the damper, thereby improving damper performance almost without design changes.

Furthermore, the vehicle of various embodiments of the present invention in which the drive shaft applying the dual mode tuning type dynamic damper connects the power train to vehicle wheels (wheel and tire), can greatly improve the resonance frequency avoidance performance on the range of 140~160 Hz appearing in the lateral direction of the drive shaft.

In addition, the vehicle of various embodiments of the present invention does not cause to rise raw material costs by increasing of damper quantity, and particularly, have a merit of maintaining a low cost merit just so in comparison with a ball joint application, by removing the beat noise (driving booming noise) and vibration generation caused by the drive shaft even though only one dynamic damper is applied to the drive shaft.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 shows an operation state of reducing beat noise and vibration of the dual mode tuning type dynamic damper during the drive shaft according to various embodiments of the present invention transmits the power of a power train to vehicle wheels.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
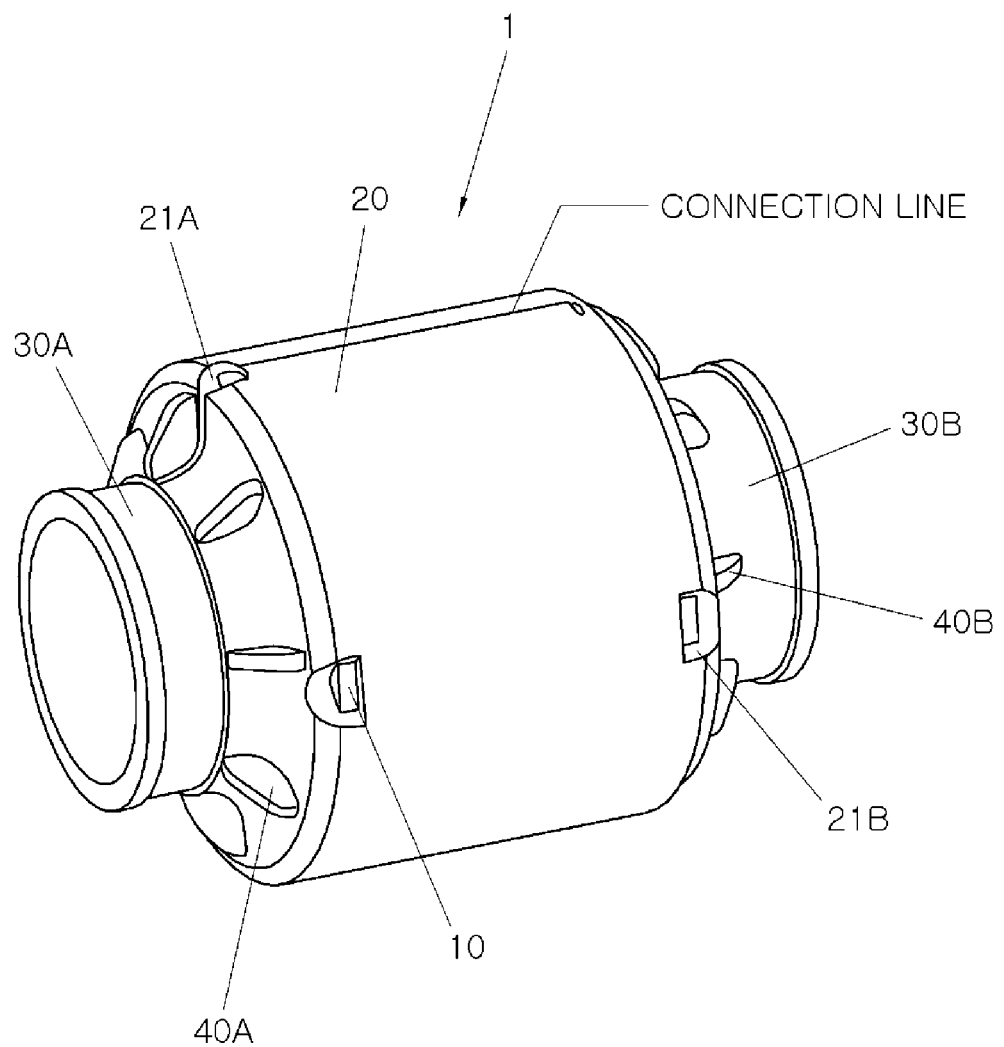
FIG. 1 is a perspective view of a dual mode tuning type dynamic damper according to various embodiments of the present invention.
Figure 2:
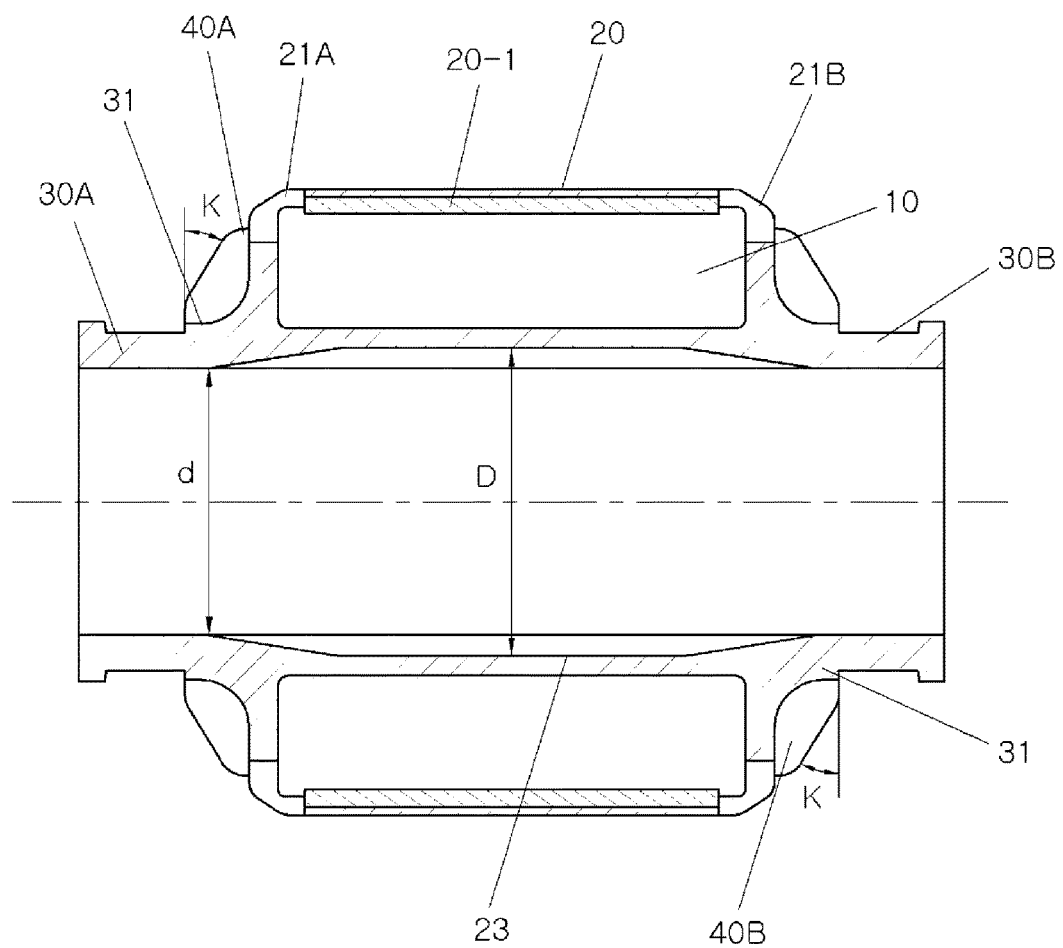
FIG. 2 is a cross-sectional view of the dual mode tuning type dynamic damper according to various embodiments of the present invention in which a main bridge and an auxiliary bridge are shown.

FIG. 1 and FIG. 2 are schematic diagrams of a dual mode tuning type dynamic damper according to various embodiments of the present invention.

Referring to an exterior shape of a dynamic damper 1 of FIG. 1, the dynamic damper 1 may include a damper mass 10, a damper housing 20, a notch groove 21A, and a bridge formed of a main bridge 30A and an auxiliary bridge 40A.

Concretely, the dynamic damper 1 may be formed in a cylinder shape where the damper housing 20 surrounds the damper mass 10. The damper housing 20 may form a dual concentric circle by that the main bridge 30A is formed to be protruded in a hollow tubular shape having a smaller diameter than the cylinder shape. The auxiliary bridge 40A may be formed at an end side wall of the cylinder where the main bridge 30A and the damper housing 20 form the dual concentric circle. The notch groove 21A may be formed around the end side wall of the cylinder of the damper housing 20 by being perforated at equal intervals with a large number and play a role of hole of communicating an inner space of the damper housing 20 with the outside.

Particularly, the notch groove 21A may form a pair with a rear notch groove 21B. The main bridge 30A may form a pair with a rear main bridge 30B. The auxiliary bridge 40A may form a pair of a rear auxiliary bridge 40B.

For example, the notch groove 21A may be perforated around the end side wall of the cylinder of damper housing 20 and the rear notch groove 21B may be perforated around an opposite end side wall of the cylinder so that a pair of the notch groove 21A and the rear notch groove 21B are formed at a left and right portions (front and rear portions in an axis length direction) of the damper housing 20. The main bridge 30A may protrude around an end side wall of the cylinder of damper housing 20 and the rear main bridge 30B may protrude around an opposite end side wall of the cylinder so that a pair of the main bridge 30A and the rear main bridge 30B are formed at the left and right portions (the front and rear portions in an axis length direction) of the damper housing 20. The auxiliary bridge 40A may be provided at a main bridge cylinder end side wall forming along with the main bridge 30A in one side portion of the damper housing 20 and the rear auxiliary bridge 40B may be formed at a rear main bridge cylinder end side wall forming the rear main bridge 30B in the other side portion of the damper housing 20 so that a pair of the auxiliary bridge 30A and the rear auxiliary 30B are formed at the left and right portions (the front and rear portions in an axis length direction) of the damper housing 20. Hereafter, the main bridge cylinder end side wall and the rear main bridge cylinder end side wall are terms for classifying a cylinder end side wall of the damper housing 20 into a left side and a right side (the front and rear portions in an axis length direction).

Therefore, the dynamic damper 1 may be formed in a dual concentric circle shape where a cylinder shape of the damper housing 20 is added to hollow tubular shapes of the main bridge 30A and the rear main bridge 30B.

Referring to a cross sectional shape of the dynamic damper 1 shown in FIG. 2, the damper mass 10 may be rubber material mass, and the damper housing 20 may provide an inner space filled with damper mass 10. The main bridge 30A and the rear main bridge 30B are protruded from the left side and the right side (the front and rear portions in an axis length direction) of the damper housing 20, respectively, and the auxiliary bridge 40A and the rear auxiliary bridge 40B are connected to the main bridge 30A and the rear main bridge 30B, respectively.

Concretely, the damper mass 10 may act as the rubber material mass without forming an empty space inside thereof but function damping with covered by the damper housing 20

The damping action takes a bending mode as a main mode and is simultaneously realized to a lateral mode.

Concretely, the damper housing 20 may be a dual tubular structure in which the inner space filled with damper mass 10 is divided by a axial hole 23, and the inner space is formed in a closed cross section by the cylinder end side wall in the left side and right side (the front and rear portions in an axis length direction). The notch groove 21A and the rear notch groove 21B are formed at a bent portion around the cylinder end side wall by being cut to a desired size, thereby forming a passage opened toward the outside. Particularly, the interior diameter D of the axial hole 23 of the damper housing 20 may be formed larger than the inner diameters d of the hollow pipes of the main bridge 30A and the rear main bridge 30B. Furthermore, an inner case 20-1 may be provided at the inner space of the damper housing 20. The inner case 20-1 may tighten the outer diameter of the damper mass 10 in the inner space of the damper housing 20 so that the inner space may form an empty space bot filled with the damper mass 10.

Concretely, the main bridge 30A and the rear main bridge 30B may be a hollow pipe structure of an equal shape, respectively. Particularly, a bridge flange 31 may be formed at one end portion of the main bridge 30A and the rear main bridge 30B, respectively and an extension flange may be formed at the other end portion thereof. The bridge flange 31 each may be formed at the main bridge cylinder end side wall and the rear main bridge cylinder end side wall forming a round section of a gentle curve surface toward the main bridge 30A at the cylinder end side wall of the damper housing 20. The extension flange each may formed with a plurality of holes to provide a connecting means connected to other components via bolts, and so on. Furthermore, the auxiliary bridge 40A and the rear auxiliary bridge 40B each may be disposed at the bridge flange 31 to be inclined at an acute angle K to form a right triangle cross sectional structure having a round base line or about right triangle cross sectional structure. As a result, the main bridge 30A and the rear main bridge 30B each may be converted to a structure of supporting side surface portions of the damper mass 10 using the auxiliary bridge 40A and the rear auxiliary bridge 40B.

Figure 3:
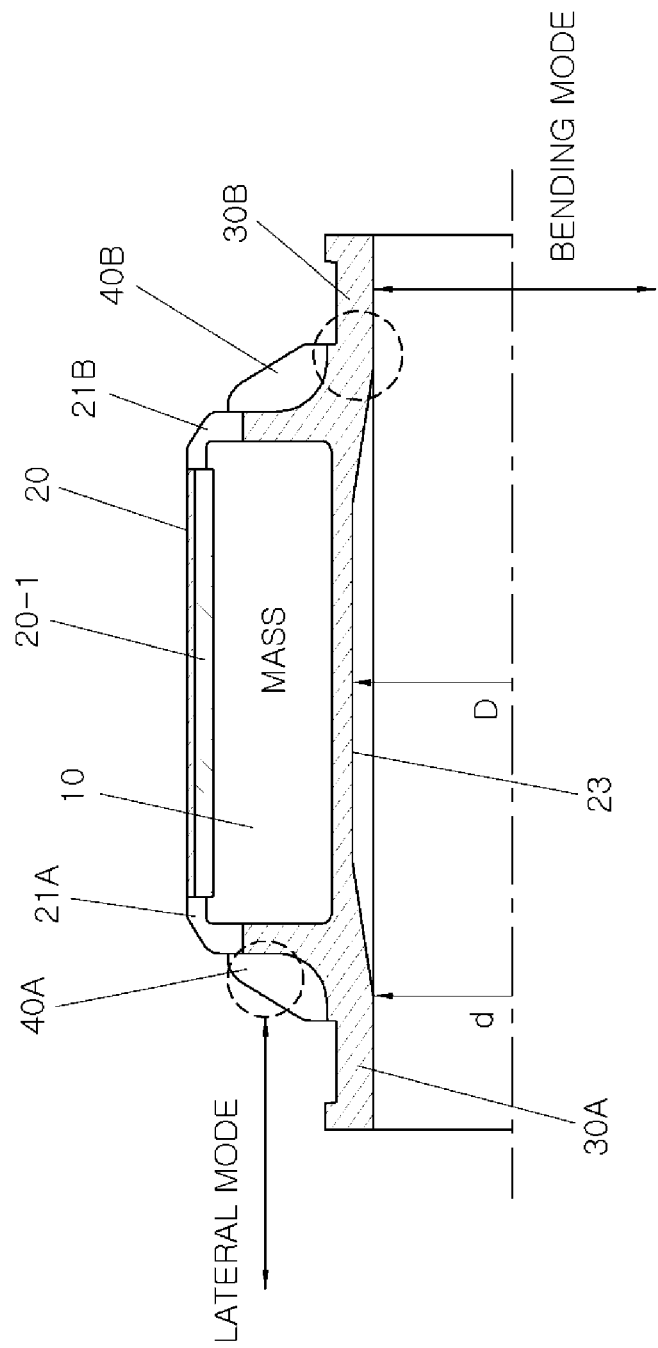
FIG. 3 shows examples of a bending mode and a lateral mode of the dual mode tuning type dynamic damper according to various embodiments of the present invention.

Meanwhile, FIG. 3 shows the bending mode and lateral mode of the dynamic damper 1.

Hereinafter, for convenience of explanation, the bending mode will be explained through the rear main bridge 30B among the main bridge 30A and the rear main bridge 30B, and the lateral mode will be explained through the auxiliary bridge 40A among the auxiliary bridge 40A and the rear auxiliary bridge 40B.

The bending mode may occur in a circumferential direction (direction vertical to an axis direction). In this case, the inner diameter d of the hollow pipe of the rear main bridge 30B is smaller than the inner diameter D of the axial hole 23 of the damper housing 20 and has a diameter closely contacted with the outer diameter of other components (for example, the drive shaft 100 shown in FIGS. 6 and 7) so that the circumferential direction (a direction vertical to an axis direction) of the damper mass 10 may be a state of not receiving a support force by the rear main bridge 30B. As a result, the size and the thickness of the rear main bridge 30B affects the bending frequency of the dynamic damper 1. At this case, the rear auxiliary bridge 40B connected to the rear main bridge 30B is formed with the thickness smaller than the thickness of the rear main bridge 30B, thereby almost not affecting the bending mode variation. Therefore, adjusting the size and thickness of the main bridge 30A and the rear main bridge 30B enables the bending frequency tuning of the bending mode of the dynamic damper 1.

The lateral mode may be occurred in the axis direction of the dynamic damper 1. In this case, the main bridge 30A supports the damper mass 10 along with the auxiliary bridge 40A so that the axial direction of the damper mass 10 may be in a state of receiving a support force by the auxiliary bridge 40A. As a result, adjusting the thickness and the number on each of the auxiliary bridge 40A and the rear auxiliary bridge 40B enables lateral frequency tuning of the lateral mode.

Figure 4:
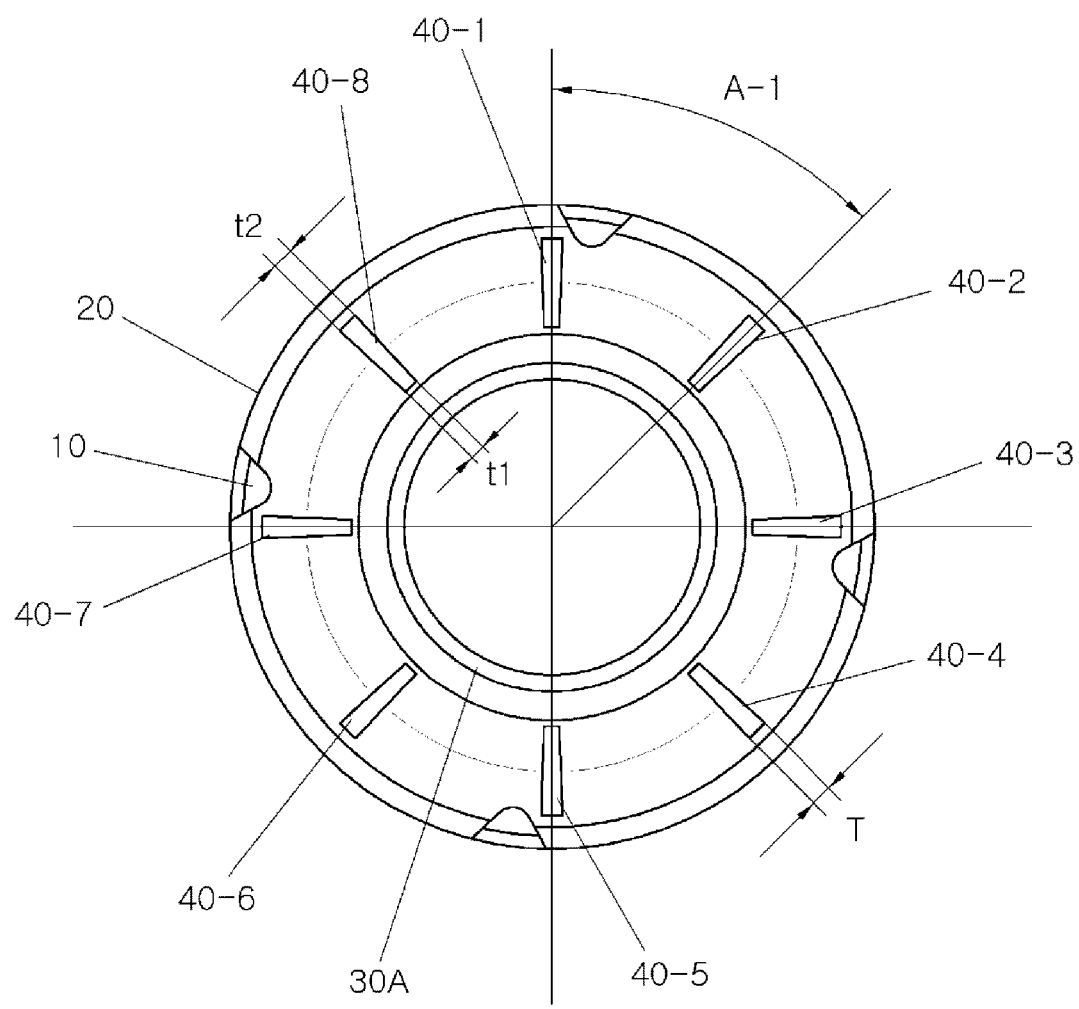
FIG. 4 is a layout example of the auxiliary bridge for the lateral mode tuning according to various embodiments of the present invention.
Figure 5:
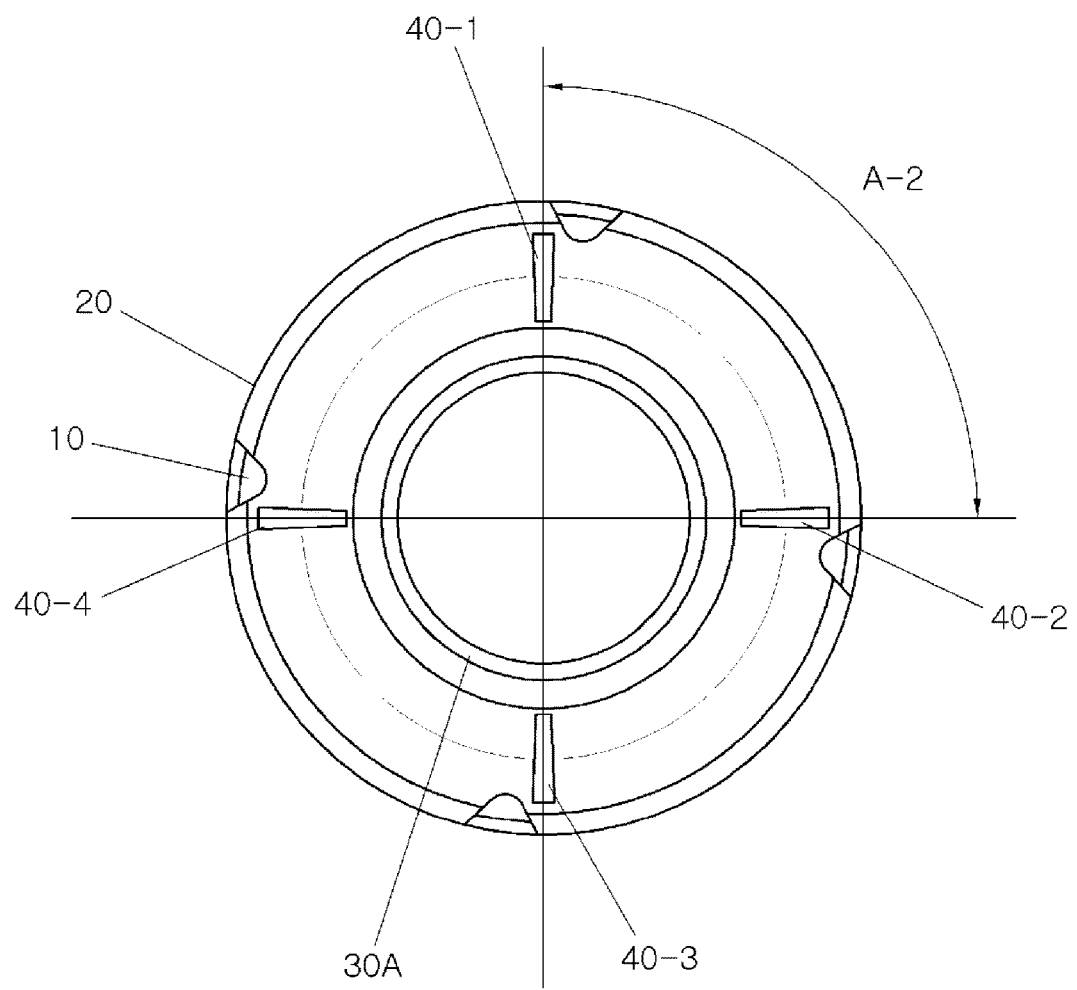
FIG. 5 is another layout example of the auxiliary bridge for the lateral mode tuning according to various embodiments of the present invention.

Meanwhile, FIG. 4 and FIG. 5 show a layout that the auxiliary bridge 40A (and the rear auxiliary bridge 40B) is arranged to form a circle at equal interval of an acute angle A-1 for lateral frequency tuning of the lateral mode. Hereinafter, for convenience of explanation, the terms of the auxiliary bridge 40A and the rear auxiliary bridge 40B are referred to as an auxiliary bridge, and the terms of the main bridge 30A and rear main bridge 30B are referred to as the main bridge 30A.

Referring to FIG. 4, the acute angle A-1 may be formed at about a 45 degree angle so that the auxiliary bridge is formed of total eight quantities divided into first, second, third, fourth, fifth, sixth, seventh, and eighth auxiliary bridges (40-1, . . . , and 40-8). Therefore, when the auxiliary bridge forms a pair of the auxiliary bridge 40A and the rear auxiliary bridge 40B, the dynamic damper 1 may include total 16 quantities of eight auxiliary bridges 40A and eight rear auxiliary bridges 40B.

Particularly, the first, second, third, fourth, fifth, sixth, seventh, and eighth auxiliary bridges (40-1, . . . , 40-8) each has an equal shape and cross sectional structure. For example, the first auxiliary bridge 40-1 may be formed by a thickness T that does not affect the bending frequency in comparison with the thicknesses of the main bridge 30A and the rear main bridge 30B. Furthermore, the thickness T of the first auxiliary bridge 40-1 may be formed in a tapering shape through a main bridge end thickness t1 arranged at the main bridge 30A being smaller than a damper housing end thickness t2 arranged at the damper housing 20.

Referring to FIG. 5, the acute angle A-1 is formed as about a 90 degree angle so that the auxiliary bridge may be formed of total four quantities divided into of a first, second, third, and fourth auxiliary bridges (40-1, . . . , and 40-4).

Therefore, when the auxiliary bridge forms a pair of the auxiliary bridge 40A and the rear auxiliary bridge 40B, the dynamic damper 1 may be formed of total eight quantities of four auxiliary bridges 40A and the rear auxiliary bridges 40B.

Accordingly, the dynamic damper 1 may variably apply total 8 or 16 or more auxiliary bridges to adjust the thickness T, the main bridge end thickness t1 and the damper housing end thickness t2, thereby enabling tuning for the lateral mode increase even without hardness increase. The Table below shows an experimental example of a lateral mode increase adjustment by adjusting the number and thickness of the auxiliary bridge without hardness increase.

TABLE 1

| CLASSIFICATION | Experimental Example #1 | Experimental Example #2 | Experimental Example #3 |
|---|---|---|---|
| HARDNESS | Hs43 | Hs41 | Hs43 |
| BENDING FREQUENCY | 113 Hz | 97 Hz | 107 Hz |
| LATERAL FREQUENCY | 220 Hz | 190 Hz | 200 Hz |

The result of experimental example #1, #2, #3 of Table 1 experimentally proves that the number and thickness increase of the auxiliary bridge increases the lateral frequency, but does not greatly affect the bending frequency because the thickness of the auxiliary bridge is thinner than that of the main bridge not to greatly contribute to the bending.

Figure 6:
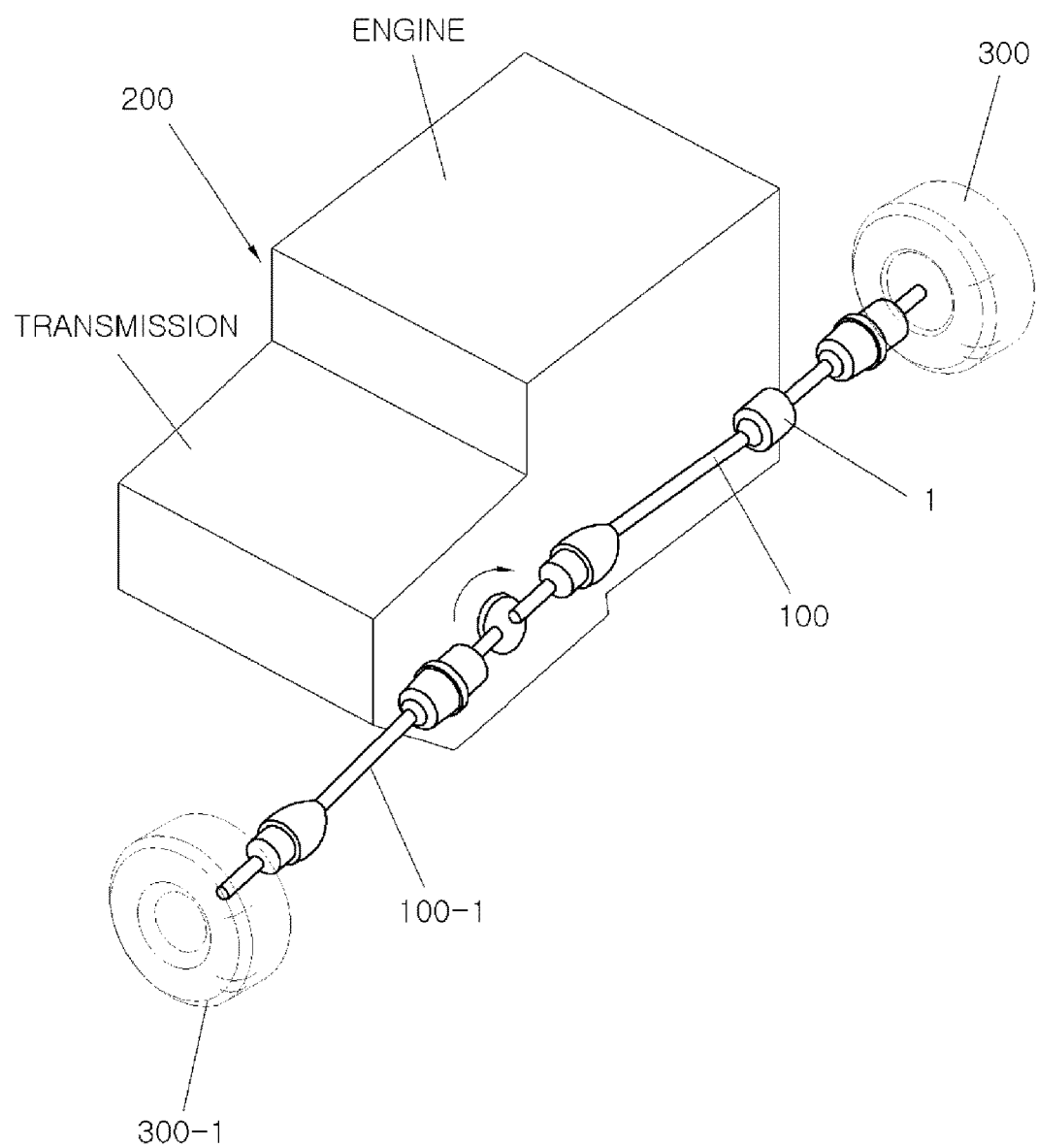
FIG. 6 is an example of a vehicle in which a power delivery system is configured by a drive shaft device applying the dual mode tuning type dynamic damper according to various embodiments of the present invention.

Meanwhile, FIG. 6 and FIG. 7 show an example of a vehicle in which a power transmission system is configured by a drive device applying the dynamic damper 1.

Referring to FIG. 6, the vehicle may include a power train 200 and a drive shaft device transmitting the torque of the power train 200 to vehicle wheels.

For example, the power train 200 may include an engine and a transmission, and a transmission output shaft of the transmission is connected to the drive shaft device to rotate it.

For example, the drive shaft device may include a drive shaft 100 of which one side is connected to the transmission output shaft and the opposite side is connected to right vehicle wheels 300 via a ball type joint, and a left drive shaft 100-1 of which one side is connected to the transmission output shaft and the opposite side is connected to left vehicle wheels 300-1 via a ball type joint. Particularly, the right drive shaft 100 is provided with the dynamic damper 1 at an outer circumference surface, the dynamic damper 1 is composed of the damper mass 10, the damper housing 20, the notch groove 21A and 21B, the main bridge 30A and 30B and auxiliary bridge 40A and 40B shown in FIG. 1 to FIG. 5. As a result, the dynamic damper 1 may become an optimal tuning of the dual mode of the bending mode and the lateral mode corresponding to the vehicle. In FIG. 6, the dynamic damper 1 is applied to only the right drive shaft 100, but applied to the left drive shaft 100-1.

Referring to FIG. 7, the dynamic damper 1 of which the dual mode of the bending mode and the lateral mode is optimally tuned to corresponding to the vehicle, is closely contacted to the outer circumference surface of the right drive shaft 100 at the hollow inner pipe diameter d of the main bridge 30A and the rear main bridge 30B. The bending mode may attenuate the vehicle starting booming, and simultaneously, the auxiliary bridge 40A and the rear auxiliary bridge 40B each is connected to the main bridge 30A and the rear main bridge 30B in order to support the damper mass 10 in an axial direction, so that the lateral mode may attenuate the beat noise and vibration generation.

As a result, the vehicle may greatly improve the beat noise (driving booming noise) sounding like "ung-ung-ung" and vibration without almost manufacturing cost increase compared to the rotation degree avoidance method upgrading ball joint specifications and the resonance frequency avoidance method increasing the number of the damper.

As described above, the dual mode tuning type dynamic damper 1 according to various embodiments of the present exemplary invention includes the damper housing 20 filled with the damper mass 10 therein, a pair of the main bridge 30A and the rear main bridge 30B of hollow pipe type which extends in a left and right axial direction of the damper housing 20 in the position outside the longitudinal section size of the damper mass 10 in order to form a dual concentric circle with the damper housing 20, and a pair of the auxiliary bridge 40A and the rear auxiliary bridge 40B disposed at a connection section of the dual concentric circle so that the left and right sides of the damper mass 10 are supported by the main bridge 30A and the rear main bridge 30B, respectively. The left and right drive shafts 100, 100-1 to which the dynamic damper 1 is applied, respectively, to the vehicle, so that the vehicle starting booming noise can be attenuated by the optimal bending mode tuning of the main bridge 30A and the rear main bridge 30B, and simultaneously, the beat noise (driving booming noise) sounding like "ung-ung-ung" and vibration may be attenuated by the optimal lateral mode tuning of the auxiliary bridge 40A and the rear auxiliary bridge 40B.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A dual mode tuning dynamic damper, comprising:
   a hollow main bridge extending in an axial direction of a damper housing in a position exterior to a damper mass filled in the damper housing and forming a dual concentric circle with the damper housing; and
   an auxiliary bridge disposed at a connection section of the dual concentric circle for side portions of the damper mass to be supported by the hollow main bridge,
   wherein the auxiliary bridge is formed at the connection section in plurality.

2. The dual mode tuning dynamic damper of claim 1, wherein a bridge flange is formed at the connection section; and
   the bridge flange is connected to the hollow main bridge in the damper housing to form the auxiliary bridge.

3. The dual mode tuning dynamic damper of claim 2, wherein the bridge flange forms a round section of a gentle curved surface.

4. The dual mode tuning dynamic damper of claim 1, wherein a thickness of the auxiliary bridge is less than that of the hollow main bridge.

5. The dual mode tuning dynamic damper of claim 1, wherein the auxiliary bridge is formed in a right-angled triangle cross-sectional structure having a base line of a round shape.

6. The dual mode tuning dynamic damper of claim 1, wherein each of the plurality of auxiliary bridges forms an equal interval with respect to each other.

7. The dual mode tuning dynamic damper of claim 1, wherein an inner diameter of the hollow main bridge is smaller than an inner diameter of an axial hole of the damper housing.

8. The dual mode tuning dynamic damper of claim 1, wherein each of the hollow main bridge and the auxiliary bridge is formed at left and right sides of the damper mass.

9. The dual mode tuning dynamic damper of claim 1, wherein the damper mass is rubber material mass not forming a void.

10. The dual mode tuning dynamic damper of claim 1, wherein
    the damper housing comprises a cylinder shape of a dual tubular structure where an inner space thereof filled with the damper mass is divided by an axial hole; and
    an inner diameter of the axial hole is greater than an inner diameter of the hollow main bridge.

11. The dual mode tuning dynamic damper of claim 9, wherein a plurality of notch grooves is formed at the damper housing by cutting.

12. A drive shaft device comprising a dynamic damper, including:
    a damper housing in which a damper mass as rubber material mass for damping is filled;
    a pair of a main bridge and a rear main bridge being hollow pipes which extend in left and right axial directions of the damper housing in a position outside a longitudinal section size of the damper mass to form a dual concentric circle with the damper housing; and
    a pair of an auxiliary bridge and a rear auxiliary bridge disposed at a connection section of the dual concentric circle for left and right sides of the damper mass to be supported by the main bridge and the rear main bridge, respectively,
    wherein the dynamic damper is disposed at at least one of a right drive shaft connected with a right vehicle wheel via a ball joint and a left drive shaft connected with a left vehicle wheel via a ball joint.

13. A vehicle comprising:
    the drive shaft device of claim 12;
    the pair of the main bridge and the rear main bridge of claim 12, and
    the pair of the auxiliary bridge and the rear auxiliary bridge of claim 12; and
    a power train for transmitting torque to the drive shaft device.

14. The vehicle of claim 13, wherein
    the power train comprises an engine and a transmission; and
    a transmission output shaft of the transmission is connected with the drive shaft device.

* * * * *